(12) United States Patent
Burke et al.

(10) Patent No.: US 9,924,734 B2
(45) Date of Patent: Mar. 27, 2018

(54) PET FOOD PALATABILITY WITH ANTIMICROBIAL PROPERTIES BASED ON ORGANIC ACIDS

(71) Applicant: Kemin Industries, Inc., Des Moines, IA (US)

(72) Inventors: Meredith Burke, West Des Moines, IA (US); Lynn Nelles, Des Moines, IA (US)

(73) Assignee: KEMIN INDUSTRIES, INC., Des Moines, IA (US)

(*) Notice: Subject to any disclaimer, the term of this patent is extended or adjusted under 35 U.S.C. 154(b) by 0 days.

(21) Appl. No.: 14/097,723

(22) Filed: Dec. 5, 2013

(65) Prior Publication Data

US 2014/0154356 A1    Jun. 5, 2014

Related U.S. Application Data

(60) Provisional application No. 61/733,697, filed on Dec. 5, 2012, provisional application No. 61/874,663, filed on Sep. 6, 2013.

(51) Int. Cl.
| | |
|---|---|
| A23K 1/00 | (2006.01) |
| A23K 1/18 | (2006.01) |
| A23K 40/30 | (2016.01) |
| A23K 20/105 | (2016.01) |
| A23K 20/111 | (2016.01) |
| A23K 50/42 | (2016.01) |

(52) U.S. Cl.
CPC .......... *A23K 1/1853* (2013.01); *A23K 20/105* (2016.05); *A23K 20/111* (2016.05); *A23K 40/30* (2016.05); *A23K 50/42* (2016.05)

(58) Field of Classification Search
CPC ...... A23K 40/30; A23K 50/42; A23K 20/105; A23K 20/111
USPC .................................. 426/62, 321, 650, 302
See application file for complete search history.

(56) References Cited

U.S. PATENT DOCUMENTS

| | | | | |
|---|---|---|---|---|
| 3,679,429 A | * | 7/1972 | Mohrman | A23K 40/30 426/302 |
| 4,011,346 A | | 3/1977 | Ernst | |
| 4,048,342 A | | 9/1977 | Haas et al. | |
| 4,215,149 A | | 7/1980 | Majlinger | |
| 4,444,796 A | * | 4/1984 | Ueno | A23K 40/10 426/335 |
| 5,186,964 A | | 2/1993 | Gerhart et al. | |
| 5,532,010 A | * | 7/1996 | Spanier et al. | 426/94 |
| 5,603,915 A | | 2/1997 | Isobe et al. | |
| 5,690,988 A | * | 11/1997 | Lin | 426/102 |
| 5,731,029 A | * | 3/1998 | Karwowski | A23L 13/67 426/513 |
| 6,177,107 B1 | * | 1/2001 | Watson et al. | 424/643 |
| 6,180,145 B1 | * | 1/2001 | Ricks | 426/243 |
| 2001/0053405 A1 | * | 12/2001 | Cheuk et al. | 426/641 |
| 2003/0082277 A1 | * | 5/2003 | Sokhey | A23K 40/30 426/92 |
| 2003/0198718 A1 | | 10/2003 | Schur | |
| 2004/0175434 A1 | * | 9/2004 | Schasteen et al. | 424/659 |
| 2005/0170067 A1 | * | 8/2005 | Shao | A23K 40/20 426/646 |
| 2005/0214349 A1 | | 9/2005 | Nie et al. | |
| 2008/0085350 A1 | | 4/2008 | Shi et al. | |
| 2008/0241333 A1 | * | 10/2008 | Cina et al. | 426/565 |
| 2009/0220674 A1 | * | 9/2009 | Katz | A23J 3/225 426/656 |
| 2009/0311390 A1 | * | 12/2009 | Phelps | B65B 25/067 426/129 |
| 2011/0124743 A1 | * | 5/2011 | Vanacker | A23K 40/30 514/773 |
| 2012/0171336 A1 | * | 7/2012 | Dixon | A23K 50/48 426/92 |
| 2012/0219682 A1 | | 8/2012 | Monteleone et al. | |
| 2012/0282356 A1 | | 11/2012 | Schrader et al. | |
| 2012/3015820 | | 11/2012 | Knueven | |
| 2013/0122154 A1 | * | 5/2013 | Villagran et al. | 426/89 |
| 2013/0122164 A1 | * | 5/2013 | Montelongo et al. | 426/310 |

FOREIGN PATENT DOCUMENTS

| | | | | |
|---|---|---|---|---|
| CA | 2336565 A1 | * | 1/2000 | ............. A01N 31/04 |
| WO | WO 02096202 A1 | * | 12/2002 | |
| WO | WO 2012018913 A1 | * | 2/2012 | |
| WO | 2012080494 A1 | | 6/2012 | |
| WO | 2012162347 | | 11/2012 | |

OTHER PUBLICATIONS

Bartek Ingedients, Inc. 1 page, 2003, downloaded from http://www.bartek.ca/pdfs/Applications/AntimicrobialPreservation/Activity/Organic%20Acids%20as%20Antimicrobial%20Agents.pdf.*
Mani-Lopez et al. Food Res. Intl. 45 (2012) 713-721.*
Crozier-Dodson et al. Process Control, Dec. 2004/Jan. 2005, 9 pages.*
Van Immerseel et al. Avian Pathology, 35:3, 182-188 2006.*
Cherrington et al. J. Applied Bactriology, 1991, 70, 1616-165.*
Ricke S.C, Poultry Sci. 82:632-639, 2003.*
Kim T.J. et al. Food Chem 118 (2010) 740-746.*
Cherrington et al. Adv Microb Physiol. 1991;32:87-108.*
Stephanie Doores, Chapter 4 in Antimicrobials in Food, Third Edition Edited by P. Michael Davidson , John N. Sofos, and A. L. Branen CRC Press 2005 pp. 91-142.*
Yeomans, Proc Nutr. Soc., vol. 57, pp. 609-615, 1998.*
"Palatability—More than a Matter of Taste", downloaded from http://extension.usu.edu/files/publications/factsheet/I_3_I.pdf, dated Mar. 1, 2003, 3 pages.*

(Continued)

*Primary Examiner* — Chhaya D Sayala

(74) *Attorney, Agent, or Firm* — Nyemaster Goode

(57) ABSTRACT

Pet food palatability enhancers based on organic acids and showing antimicrobial efficacy are described.

4 Claims, 1 Drawing Sheet

(56) References Cited

OTHER PUBLICATIONS

Davidson, P.M., et al. 2007. Chemical preservatives and natural antimicrobial compounds. In: Doyle, M.P., Beuchat, L.R., Montville, T.J. (Eds.), Food Microbiology: Fundamentals and Frontiers. ASM, Washington, Chapter 33 pp. 713-717.*
Abstract, Downloaded from http://www.chemistryindustry.biz/acidulants.html on Sep. 9, 2017.*
Shukla P, Akshay S, Ashok S (2017) Food Additives from an Organic Chemistry Perspective. MOJ Biorg Inorg Chem 1(3): 00015. DOI: 10.15406/mojboc.2017.01.00015.*
Luck, "Food applications of sorbic acid and its salsts" Food Addit Contam. Sep.-Oct. 1990;7(5):711-5.*
"Fumaric acid in Food Preservatives" 1 page, downloaded from http://www.fumaricacidmanufacturer.com/fumaricacidfoodpreservatives, dated Mar. 2003.*
M. S. Rahman, Handbook of Food Preservation, 2007, p. 491.*
Aldrich, G., "Lactic Acid: Magic Bullet for Petfood Safety?", "Pet Food Industry Magazine", Jun. 2012.
Aldrich, G., "Sodium Bisulfate: Multipurpose Petfood Ingredient", May 2012, Publisher: Pet Food Industry Magazine.
Behravesh et al., "Human *Salmonella* Infections Linked to Contaminated Dry Dog and Cat Food", "Pediatrics", Sep. 2010, pp. 477-484, vol. 126, No. 3.
Chen et al., "Control of *Salmonella* in Low Moisture Foods", "Grocery Manufacturers Association", Feb. 2009.
Chung et al., "Growth of *Salmonella* at Low pH", 1970, pp. 326-328, vol. 35, Publisher: Journal of Food Science.
Clark et al., "Characterization of *Salmonella* Associated with Pig Ear Dog Treats in Canada", "Journal of Clinical Microbiology", Nov. 2001, pp. 3962-3968, vol. 39, No. 11.
Finley et al., "Human Health Implications of *Salmonella*-Contaminated Natural Pet Treats and Raw Pet Food", "Food Safety", Jan. 2006.
Joardar et al., "*Salmonella* Control in Feed: Can Organic Acids Application be an Important Part of the Solution", "17th Annual ASAIM SEA Feed Technology & Nutrition Workshop", Jun. 2009.
Schotte et al., "*Salmonella* Montevideo Outbreak in Militay Kennel Dogs Caused by Contaminated Commerical Feed, Which Was Only Recognized Through Monitoring", "Veterinary Microbiology", 2007, pp. 316-323, vol. 119.

* cited by examiner

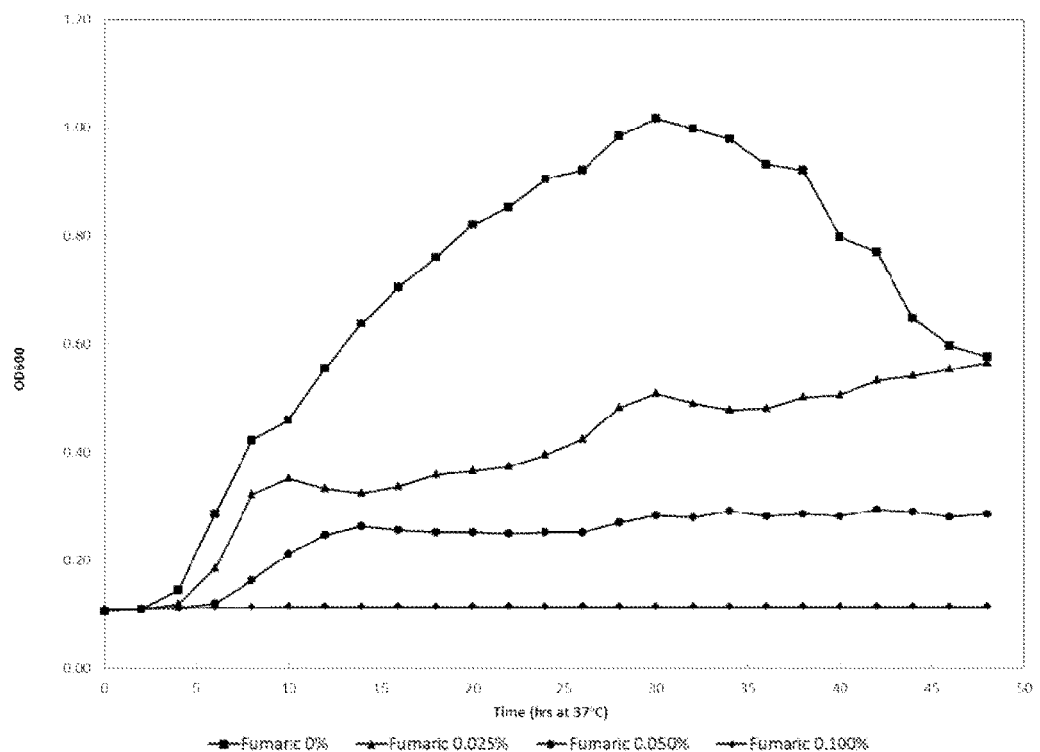

PET FOOD PALATABILITY WITH ANTIMICROBIAL PROPERTIES BASED ON ORGANIC ACIDS

This application claims priority to U.S. Patent Application Ser. No. 61/733,697, filed Dec. 5, 2012, and to U.S. Patent Application Ser. No. 61/874,663, filed Sep. 6, 2013, and incorporates the same herein in their entirety by this reference.

BACKGROUND OF THE INVENTION

The present invention relates generally to pet food palatability enhancers and, more specifically, to pet food palatability enhancers, sometimes called palatants, including organic acids and which have antimicrobial efficacy.

The palatability of pet food depends on many factors such as the freshness of raw materials through the entire pet food manufacturing process including the application of a palatability enhancer. Palatability enhancers are made from a wide variety of ingredients providing improved palatability and aroma performance. The use of palatants offers consistent flavor performance to assist in providing consistent pet food consumption.

Palatability enhancers for low moisture pet foods include various surface coating compositions. Liquid or dry animal digest coatings are widely used to enhance palatability and are commonly applied either together with an enrobing fat for coating dry kibble or applied after the enrobing fat. It has become very common to include a pyrophosphate as a palatability enhancer in cat food diets. The palatability, nutritional benefit and healthfulness of pet foods can, of course, be adversely affected by spoilage caused by microbial growth. A palatability enhancer that has antimicrobial efficacy will thus provide multiple benefits to the pet food.

SUMMARY OF THE INVENTION

The invention consists of pet food palatability enhancers that include organic acids that act not only as a palatability enhancer but also have antimicrobial efficacy. Not all organic acids provided a palatability enhancing effect or negatively affected palatability when applied at a rate that also provided antimicrobial efficacy. For example, while fumaric acid (tans-butenedioic acid) is one of the preferred organic acids, its cis-isomer, maleic acid, has a repulsive, astringent taste. Malic acid and tartaric acid also had adverse effects on palatability.

The palatability enhancers of the present invention include one or more organic acids, including citric acid, fumaric acid, gallic acid, sorbic acid, succinic acid and tannic acid, that are applied to a dry pet food at a rate that provides antimicrobial efficacy while enhancing palatability of the dry pet food or without adversely affecting the palatability of the dry pet food. The organic acids may be used alone or in combination with one or more of the other organic acids. In addition, the organic acids can be combined with other palatability enhancers, such as animal digests, pyrophosphates, sodium bisulfate, and the like.

The palatability enhancers of the present invention provide a composition that is applied to the dry pet food at a rate so that the organic acid is between 0.05% and 3.0% by weight of the dry pet food, preferably between 0.1% and 1.2% by weight of the dry pet food, and preferably between 0.2% and 1.0% by weight of the dry pet food.

In a preferred embodiment, the palatability enhancers of the present invention are compositions including pyrophosphate and, optionally, yeast and/or animal digest in combination with a composition of one of fumaric acid, citric acid, gallic acid, sorbic acid, succinic acid and tannic acid, applied at a rate that provides antimicrobial efficacy to a dry cat food while enhancing the palatability of the dry cat food.

In another preferred embodiment, the present invention is a method for preserving a dry pet food, wherein a composition of one or more of fumaric acid, citric acid, gallic acid, sorbic acid, succinic acid and tannic acid is applied at a rate that preserves the dry pet food while not adversely affecting the palatability of the dry pet food.

BRIEF DESCRIPTION OF THE FIGURES

FIG. 1 is a chart of the effect of fumaric acid (0%; 0.025%; 0.050%; 0.100%) on the growth of *Salmonella enterica* ser. Infantis in modified tryptic soy broth (pH 4.93) for 48 hours at 37° C.

DESCRIPTION OF THE INVENTION

The term "animal" means a human or other animal that may choose an edible composition based upon its palatability, and specifically includes pets, companion animals and other similar terms.

The term "animal digest" means herein material which results from chemical and/or enzymatic hydrolysis of clean, undecomposed animal tissue and is consistent with the definition promulgated by the Association Of American Feed Control Officials, Inc. (AAFCO). Animal digests may also be referred to as "animal by-products".

The term "antimicrobial efficacy" means the ability to reduce the number of microorganisms over a period of time. The term also applies to the ability to prevent the growth of microorganisms over a period of time.

The term "coating" refers to the topical deposition of a palatability-enhancing composition onto the surface of the basal food composition, such as by spraying, dusting, painting, and the like.

The terms "dry" and "low moisture" when referring to pet foods mean food compositions, including but not limited to kibbles, that contain less than 12% moisture.

The term "enhanced palatability" refers to a pet food for which a pet exhibits preference relative to a control composition.

The term "inorganic pyrophosphates" or "pyrophosphates" include alkali metal pyrophosphates, encompassing monoalkali metal pyrophosphates and polyalkali metal pyrophosphates. Examples of monoalkali metal pyrophosphates include sodium trihydrogen pyrophosphate, potassium trihydrogen pyrophosphate and calcium hydrogen pyrophosphate. Polyalkali metal pyrophosphates include dialkali metal pyrophosphates, trialkali metal pyrophosphates, tetralkali metal pyrophosphates, and the like. Examples of dialkali metal pyrophosphates include disodium pyrophosphate, dipotassium pyrophosphate, dicalcium pyrophosphate and dizinc pyrophosphate. Trialkali metal pyrophosphates are, for example, trisodium pyrophosphate, tripotassium pyrophosphate. An example of a tetralkali metal pyrophosphate is tetrasodium pyrophosphate. Pyrophosphates may be anhydrous or hydrated.

The term "kibble" means particulate chunks or pieces formed by either a pelleting or extrusion process. The pieces can vary in sizes and shapes, depending on the process or the equipment.

The term "organic acid" means an organic compound with acidic properties and includes carboxylic acids, whose acidity is associated with their carboxyl group. Non-limiting examples of organic acids include acetic acid, butyric acid, capric acid, caproic acid, caprylic acid, citric acid, formic acid, fumaric acid, gallic acid, lactic acid, maleic acid, malic acid, propionic acid, sorbic acid, succinic acid, tannic acid and tartaric acid.

The term "palatability" means a relative preference of an animal for one food composition over another. Whenever an animal shows a preference, for example, for one of two or more foods, the preferred food is more palatable and has enhanced palatability. The relative palatability of one food compared to one or more other foods can be determined, for example, in side-by-side, free-choice comparisons including a standard testing protocol in which the animal has equal access to both compositions such as a test called the "two-pan method".

The terms "palatability enhancers", "palatants", "flavors", "flavor enhancers", and any other similar terms mean any material that enhances the palatability of a food composition to an animal. Typically, a palatability enhancer for animal food is an edible composition that provides an aroma, taste, aftertaste, smell, mouth feel, texture, and/or organoleptic sensation that is appealing or pleasing to the target animal. Examples of palatability enhancers include digests, proteins, peptides, amino acids, carbohydrates fats or lipids, nutrients, anti-oxidants, preservatives, surfactants, texturing agents, yeasts, and flavors.

The terms "pet" and "companion animal" are synonymous and mean any domesticated animal including, without limitation, cats, dogs, ferrets, gerbils, guinea pigs, hamsters, mice, rabbits, and the like.

The term "pet food" means a composition intended for consumption by a pet.

The term "preserving" means extending the length of time that a pet food may be stored without becoming unfit for use or consumption due to microbial growth and is consistent with the definition promulgated by AAFCO.

The term "yeast" herein refers to any yeast, preferably inactive, as well as to yeast by-products that are compatible with compositions for animal consumption. Yeasts are well known in the art as being protein-rich. Yeasts include, without limitation, brewer's yeast, baker's yeast, molasses yeast, and the like. Yeast by-products include, without limitation, yeast extracts, yeast hydrolysates, cream yeasts, and the like.

Where ranges are used in this disclosure, the end points only of the ranges are stated so as to avoid having to set our and length and describe each and every value included in the range. Any appropriate intermediate value and range between the recited endpoints can be selected. By way of example, if a range of between 0.1 and 1.0 is recited, all intermediate values (e.g., 0.2, 0.3. 6.3, 0.815 and so forth) are included as are all intermediate ranges (e.g., 0.2-0.5, 0.54-0.913, and so forth).

The palatability enhancers of the present invention are prepared using organic acids of a quality suitable for use in feeding companion animals. The organic acids may be from any source and are preferably processed to a particle size that provides uniform coverage and high efficacy when applied to kibble. In preferred embodiments, the organic acid was processed to a particle size where greater than 50%, and preferably greater than 95%, of the material passes an 80 mesh screen.

In accordance with this invention, the palatability enhancer is applied to the surface of dry pet food, usually in the form of pellets or kibbles, and may be used in conjunction with other palatability enhancing ingredients. While the palatability enhancers of the present invention can be used as an ingredient incorporated in the composition of the pet food product per se, if used as a coating less enhancer is required and the animal receives the maximum exposure to the enhancer. The enhancer compositions used for coating can be liquid or dry. This will depend on a number of factors including the target animal, the product to be coated, costs of ingredients, flavoring agent to be used and coating equipment to be used.

EXAMPLE 1

Evaluation of Palatability

General Approach to Formulation. The goal of the original project was to develop a dry cat formula with palatability greater than or equal to the designated benchmark. The formula was to be coated at 1.5% application rate and meet strict cost constraints. Such a formula was developed containing Maillard-reacted liver hydrolysate, dried yeast, 24.5% cornstarch, disodium pyrophosphate which is known in the industry as sodium acid pyrophosphate (SAPP), and 0.5% canola oil, and is referred to herein as Starting Dry Blend. The palatability, expressed as Intake Ratio (IR), of the Starting Dry Blend was favorable (Table 1, Trial No. 203).

TABLE 1

Trial Formulas and Measure of Palatability

| Trial No. | % Additive in Formula | IR | Significance |
|---|---|---|---|
| 203 | 24.5% corn starch | 0.58 | NS |
| 366 | 14% sodium bisulfate | 0.36 | p ≤ 0.001 |
| 412 | 33% tartaric acid | 0.24 | p ≤ 0.001 |

When the project was extended to include study of the antimicrobial properties of added compounds, the formula used in trial 203 was chosen as a starting point because the palatability enhancing performance was already acceptable and it was anticipated that the large amount of starch (palatability neutral filler) in the dry blend could be replaced with antimicrobial compound(s) without loss of palatability.

Palatant Formulas. The starting formula consisted of the Starting Dry Blend. SAPP is considered to be the primary palatability driver in the formula. Therefore, the SAPP content was maintained in a narrow range. The starch was replaced with candidate antimicrobial(s). If the antimicrobial content was less than 24.5%, the hydrolysate and yeast were proportionally increased. In the examples (Trial No. 412 in Table 1 and No. 481 in Table 2) where the antimicrobial content exceeded 24.5%, the hydrolysate and yeast were proportionally decreased. The canola oil (an anti-dust ingredient) was deleted from the Starting Dry Blend. In all trials, the palatant formula was coated on the kibble at 1.5%.

TABLE 2

Trial Formulas and Measure of Palatability

| Trial No. | % Fumaric Acid in Formula | % Fumaric Acid on Kibble | IR | Significance |
|---|---|---|---|---|
| 426 | 14* | 0.21 | 0.57 | NS |
| 465 | 14** | 0.21 | 0.62 | p ≤ 0.01 |
| 412 | 20** | 0.30 | 0.77 | p ≤ 0.001 |
| 481 | 27** | ~0.41 | 0.74 | p ≤ 0.001 |

*30 mesh sieve
**80 mesh sieve

Kibble Coating and Palatability, The A Ration was prepared by applying a 1.5% coating of palatant over 5% poultry fat containing 900 ppm Naturox Premium Liquid antioxidant (Kemin Nutrisurance, Des Moines, Iowa) onto nutritionally balanced commercial kibble. The kibble was warmed to 37-39° C. in a rotating drum with a heat gun. The poultry fat was warmed to 40-50° C. and sprayed evenly onto the kibble. The palatant was then applied by hand. The B Ration, in all cases, was the same off-the-shelf name brand cat food.

The diets were fed to panels of 20 cats for 2 days. Palatability testing was performed using the two-pan method. This method provides the animals with both diets simultaneously and is also referred to as the paired-eating method. The diets were presented to each cat on an individual basis with bowl placement reversed daily to avoid left-right bias. The diet was presented once daily for a period of 4 hours and if one diet was consumed before the end of 4 hours, both diets were removed. The amount consumed was recorded for each cat.

Statistics. The individual intake ratio (IR=[A/(A+B)]) was calculated for each animal and averaged over the entire panel. For reference, IR scores of 0.25, 0.33, 0.5, 0.66, and 0.75 correspond to consumption preferences of 1:3, 1:2, 1:1, 2:1, and 3:1, respectively. A one-tailed Student t-test was used to compare the average intake ratio to the null hypothesis of even consumption, 0.50. Significance of data is represented by a p value or NS, not significant. The p value relates the strength of the conclusion that A and B consumption are different, or that there is an indicated preference for one in comparison to the other.

Results. Acids are widely recognized as potent antimicrobial agents. In general, the present invention is focused on ingredients already approved by the Association of American Feed Control Officials Incorporated (AAFCO) that might possess antimicrobial activity. Of course, non-AAFCO approved acids may also function efficaciously and are within the scope of the invention.

Sodium bisulfate (SBS) and tartaric acid are examples of dry powders that might be expected to have antimicrobial capability. These were included in the palatant formula at 14% and 33% levels, and tested for palatability against the benchmark. These trials, Nos. 366 and 412 (Table 1) showed significant declines in palatability relative to the starting formula (Trial No. 203).

In an initial trial (Table 2, Trial No. 426), 14% fumaric acid was included in the formula. The fumaric acid was used out of the manufacturer's bottle. It was found that 100% of the fumaric acid out of the bottle passed a 30 mesh screen; no further size analysis was performed. Since the palatability score was similar to trial No. 203 (Table 1), it appeared that the fumaric acid may be palatability neutral, like the starch.

The intention was to test the efficacy of the coated kibble in controlling *Salmonella* spp. and so more finely ground fumaric acid was used to provide a more thorough and uniform covering of the kibble surface, thereby possible increasing effectiveness. In the remainder of the trials in Table 2, the fumaric acid passed an 80 mesh screen. The repeat trial (Trial No. 465) using the finer powder had a higher palatability score and showed significant efficacy against *Salmonella* spp. In an effort to increase efficacy, the fumaric acid inclusion rate was increased to 20% and 27% (Trial Nos. 480 and 481, respectively). Both of these formulas demonstrated significant efficacy against *Salmonella* spp. in the kibble challenge test. Unexpectedly, the palatability scores also increased significantly.

EXAMPLE 2

Antimicrobial Efficacy Study 1

Phase 1—Demonstration of Fumaric Acid Efficacy Against *Salmonella* spp. In Vitro.

Scope

The project objective was to develop a palatant with antimicrobial properties that would protect an animal food from spoiling due to microorganisms and thereby extend the shelf life of the animal food. It is common in the industry to use a challenge test to evaluate the ability of a composition to provide antimicrobial efficacy to a pet food. A list of possible antimicrobials, acids, and combinations thereof, along with pKa was compiled. From the list, the antimicrobials that were readily available and AAFCO-approved were chosen for screening for efficacy against *Salmonella* in vitro. While many acids were evaluated, only fumaric acid is in this example.

Materials and Methods

Preparation of *Salmonella* culture. *Salmonella enterica* subsp. *enterica* (ATCC® 51741™), was obtained from the American Type Culture Collection (ATCC®) and kept as a frozen stock at −70° C. in Bacto™ Tryptic Soy Broth (TSB) with 20% (w/v) glycerol. One vial of the frozen stock culture was thawed at room temperature and 0.100 mL was transferred to 100 mL TSB (pH 7.2) containing (g/l) pancreatic digest of casein: 17, enzymatic digest of soybean meal: 3, sodium chloride: 5, dipotassium phosphate: 2.5, dextrose, 2.5, then incubated at 37° C. for 24 hours on a platform shaker set at 190 rpm. One ml of overnight culture was diluted in 9 ml 0.85% saline and enumerated using a Petroff Hauser Counting Chamber. The culture was diluted in 0.85% saline to obtain 1,000,000 colony forming units per milliliter (CFU/mL) of a standardized inoculum. One hundred µl of inoculum was pipetted into designated wells on a 96 well microplate. In order to simulate the pH of the palatant (as a 5% solution), TSB (pH 7.2) containing (g/l) pancreatic digest of casein: 32, enzymatic digest of soybean meal: 6, sodium chloride: 10, dipotassium phosphate: 5, dextrose: 5, was adjusted to pH 4.9 using 1N HCl.

Preparation of acid solutions. A 0.20% stock solution of fumaric acid was made by dissolving 0.100 g (w/v) fumaric acid in 50 ml sterile deionized water in a flask. The 0.20% stock was diluted 1:2 in sterile deionized water to obtain a 0.10% fumaric acid solution, which was then diluted 1:2 to obtain a 0.05% fumaric acid solution. Each fumaric acid stock solution (0.20%, 0.10% and 0.05%) was further diluted 1:2 in TSB (pH 4.9) to yield fumaric acid-TSB solutions of 0.100%, 0.050% and 0.025%. The pH of each fumaric-TSB solution was measured (Table 1). One hundred µl of each fumaric-TSB solution was added to triplicate wells containing 100 µl standardized inoculum. One hundred µl of untreated (0% fumaric) TSB (pH 4.9) was added to triplicate wells containing 100 µl standardized inoculum as a control. The microplate was placed in a Versamax Microplate Reader (Molecular Devices) (37° C.) with wavelength set to 600 nm. The optical density ($OD_{600}$) was read every 2 hours for 48 hours.

Results

Solutions of fumaric acid at three different concentrations (Table 3) were evaluated for inhibition of *S. enterica* growth in vitro using a microplate assay and measuring optical density over time (FIG. 1).

TABLE 3 pH values for fumaric acid-TSB solutions used to determine inhibition of *S. enterica* growth in vitro.

| Acid | Concentration | pH in TSB |
|---|---|---|
| Fumaric | 0% | 4.93 |
| Fumaric | 0.025% | 4.67 |

TABLE 3-continued pH values for fumaric acid-TSB solutions used to determine inhibition of *S. enterica* growth in vitro.

| Acid | Concentration | pH in TSB |
|---|---|---|
| Fumaric | 0.050% | 4.42 |
| Fumaric | 0.100% | 4.06 |

Phase 2—Efficacy of a Dry Palatability Enhancer Including Acid on Cat Kibbles Challenged with *Salmonella*.
Scope Fumaric acid was identified as an effective antimicrobial agent against *S. enterica* in the microtiter plate assays. In order to determine the antimicrobial efficacy of a palatant formulated with fumaric acid, challenge studies on cat kibble were conducted.
Materials and Methods Preparation of dried *Salmonella* cocktail inoculum. Five *Salmonella enterica* serovars [*S. enterica* (ATTC® 51741™), Montevideo (ATCC® 8387™), *Typhimurium* (ATCC® 14028™), Senftenberg (ATCC® 43845™), *Schwarzengrund* (4012)] were grown in Brain Heart Infusion (pH 7.4) (BHI; Oxoid) containing (g/l) calf brain infusion solids: 12.5, beef heart infusion solids: 5.0, proteose peptone: 10.0, glucose: 2.0, sodium chloride: 5.0, disodium phosphate: 2.5, at 37° C. for 24 hours on a platform shaker set at 200 rpm. Five beakers containing meat and bone meal slurry (MBM) comprised of 1 part (75 g) 50% rendered pork meat and bone meal and 3 parts (225 g) deionized water were sterilized by autoclave (121° C., 60 minutes). One ml of each *Salmonella* culture was separately inoculated into a beaker containing tempered (ambient), sterilized MBM which was then incubated at 37° C. for 48 hours. Inoculated MBM was dispensed (approx. 200 g) into sterile 250 ml centrifuge bottles and centrifuged at 5,000 rpm for 10 minutes. The supernatant was decanted and autoclaved for disposal. The pellets were suspended in 10 ml TSB-20% glycerol. Suspensions (approximately 150-160 g) were transferred to sterilized 250 ml polycarbonate straight side wide mouth jars with lids (Nalgene, Thermo Scientific). Jars containing MBM-*Salmonella* suspensions were immediately frozen at −70° C. for 1 hour. Frozen MBM-Salmonella suspensions were lyophilized using a FreeZone-1 Liter benchtop freeze dry system (Labconco) (approx. 96 hours, −50° C.). Each lyophilized *Salmonella* culture was pulverized to a fine powder using a sterile mortar and pestle. Twenty g of each of the five lyophilized *Salmonella* cultures was combined in a sterile wide mouth glass jar to make the dried *Salmonella* cocktail inoculum. The dried cocktail inoculum was enumerated by diluting 1.00 g (±0.01) in 9.0 ml sterile saline solution (0.85% NaCl) of which serial dilutions (1 ml to 9 ml) were plated with XLD Agar. Solidified plates were incubated inverted at 37° C. for 16-18 hours. Visible colonies were counted and colony forming units per gram were calculated (CFU/g). The final concentration of the dried cocktail inoculum was $1.60 \times 10^6$ CFU/g.

Procedure for kibble challenge. Cat kibble coated with palatant (500 g) was challenged with cocktail inoculum (5.00 g). Kibble and inoculum were mixed together for five minutes by hand in a plastic zip top bag, and allowed to rest for 1 hour prior to sampling. Coated, un-inoculated kibble was also included in the study and tested for *Salmonella* (direct plating and FDA BAM), total aerobic bacteria, mold and yeast counts, pH, percent moisture, and water activity. For each analysis time point challenged kibble was sampled in triplicate. Kibbles were stored at ambient temperature.

Microbiological analysis. Challenged kibble samples bags were mixed thoroughly, then 5.00 g (±0.01) was aseptically weighed into a sterile plastic bag and diluted with 45 ml sterile Phosphate Buffer (Butterfield) diluent (BPB) containing (g/l) $KH_2PO_4$ 34.0, pH adjusted to 7.2 with 1N sodium hydroxide and homogenized using a Stomacher (Seward Stomacher 80) for 1 minute and serially diluted in BPB for plating. The plates are poured with tempered (45° C.) XLD agar. After solidification, plates were inverted and placed in an incubator (37° C.). Colonies were counted and CFU/g was calculated. The counts for each triplicate sample were averaged and expressed as log CFU/g. Those samples of which were below the detection limit of <10 CFU/g were assigned 0 log CFU/g for the purpose of statistical analysis. Analysis of Variance using the LSD separation of means method was performed to analyze the data using StatGraphics software (StatPoint Technologies, Inc. Warrenton, Va.). A P-value of <0.05 was considered statistically significant.
Results The effect of fumaric acid on *Salmonella* challenged on the surface of cat kibble was examined. Cat kibbles were challenged with approximately 4.20 log CFU/g of a dried five strain *Salmonella* cocktail inoculum prep. After eight days, challenged kibbles coated with the dry palatant containing fumaric acid had significantly lower *Salmonella* counts compared to kibbles coated with the control dry palatant. The effect remained significant throughout the study thus showing the antimicrobial efficacy of the compositions.

TABLE 4

Inactivation of *Salmonella* on cat kibble (n = 3) by a dry cat palatant containing acid.

| | *Salmonella* (log CFU/g) | |
|---|---|---|
| Time (day) | Control | Fumaric Acid 0.21% |
| 0 | $3.35 \pm 0.23^{Aa}$ | $2.79 \pm 0.35^{Aa}$ |
| 1 | $3.35 \pm 0.27^{Aa}$ | $2.85 \pm 0.07^{Aa}$ |
| 8 | $2.74 \pm 0.16^{Aab}$ | $2.02 \pm 0.13^{Bab}$ |
| 14 | $3.01 \pm 0.20^{Aab}$ | $1.44 \pm 0.24^{Bbc}$ |
| 22 | $2.66 \pm 0.15^{Ab}$ | $0.77 \pm 0.39^{Bc}$ |

$^{A-B}$Means in the same row followed by different letters are significantly (p < 0.05) different by LSD separation of means method.
$^{a-c}$Means in the same column followed by different letters are significantly (p < 0.05) different by LSD separation of means method.

Phase 3—Efficacy of a Dry Palatability Enhancer Including Acid on Cat Kibbles Challenged with *Salmonella*.
Scope In Phase 2, fumaric acid included in a dry palatant on cat kibbles demonstrated antimicrobial activity and a non-significant cat palatability (IR=0.57), therefore it was recommended to blend a palatant containing increased levels of fumaric acid to determine the maximum fumaric acid inclusion that would have acceptable palatability and, theoretically, increased antimicrobial efficacy.
Materials and Methods All procedures for the Phase 3 kibble challenge were conducted as described for Phase 2.
Results The antimicrobial effect of fumaric acid at two different inclusions in a dry cat palatant was examined. A significant reduction in *Salmonella* count was observed immediately (day 0) for the kibbles coated with palatant containing the highest level of fumaric acid. Counts were reduced below detection limit (<10 CFU/g) after 1 day.

TABLE 5

Inactivation of *Salmonella* on cat kibble (n = 3) by a dry cat palatant containing two inclusion rates of acid.

| Time | *Salmonella* (log CFU/g) | | |
|---|---|---|---|
| (day) | Control | Fumaric Acid 0.30% | Fumaric Acid 0.41% |
| 0 | 2.95 ± 0.19$^{Aa}$ | 2.44 ± 0.21$^{Aa}$ | 1.46 ± 0.09$^{Ba}$ |
| 1 | 2.41 ± 0.12$^{Ab}$ | 1.26 ± 0.14$^{Bab}$ | 0.0 ± 0.0$^{Cb}$* |
| 5 | 2.61 ± 0.07$^{Aab}$ | 0.57 ± 0.57$^{Bb}$ | 0.0 ± 0.0$^{Bb}$* |

$^{A\text{-}B}$Any means in the same row followed by different letters are significantly ($p < 0.05$) different by LSD separation of means method.
$^{a\text{-}c}$Any means in the same column followed by different letters are significantly different ($p < 0.05$) by LSD separation of means method.
*Below detection limit of the assay.

A comparison of the reduction in *Salmonella* counts across Phase 2 and Phase 3 for the three inclusion rates of fumaric acid reveals a dose response.

EXAMPLE 3

Antimicrobial Efficacy Study 2

Efficacy of a Cat Palatant Formulated with 14%, 20% and 27% Fumaric Acid Against *Salmonella* In Vitro.

In the Phase 3 experiment described below, solutions (15% w/v) of cat palatant samples were challenged with a "Low" concentration (1,000 CFU/ml) and a "High" concentration (1,000,000 CFU/ml) of a liquid *Salmonella* spp. inoculum in an effort to evaluate the antimicrobial effect of each palatant. *Salmonella* was enumerated from each palatant at three time points after challenge; immediately, 24 hours and 6 days.

Materials and Methods

Preparation of palatant samples. Four samples of a cat palatant formulated with varying levels of fumaric acid (Table 6) were aseptically weighed in duplicate sterile 50 ml conical test tubes. To each test tube, 10 ml of sterile deionized water was added and mixed by vortex. The pH of a 5% (w/v) solution of each palatant was also measured (Table 6).

TABLE 6 pH values for cat palatant formulated with fumaric acid.

| % Fumaric Acid in formula | pH |
|---|---|
| 0 | 4.94 |
| 14 | 3.15 |
| 20 | 3.01 |
| 27 | 2.93 |

Preparation of *Salmonella* cultures. Five *Salmonella enterica* serovars [*S. enterica* (ATTC® 51741™), Montevideo (ATCC® 8387™), *Typhimurium* (ATCC® 14028™), *Senftenberg* (ATCC® 43845™), *Schwarzengrund* (4012)] were kept as frozen stocks at −70° C. in Bacto™ Tryptic Soy Broth (TSB) with 20% (w/v) glycerol. One vial of each culture was thawed at room temperature and 0.100 ml was transferred to 100 m TSB (pH 7.2) containing (g/l) pancreatic digest of casein: 17, enzymatic digest of soybean meal: 3, sodium chloride, 5, dipotassium phosphate: 2.5, dextrose, 2.5, then incubated at 37° C. for 24 hours on a platform shaker set at 190 rpm. One ml of each overnight culture was diluted in 9 ml 0.85% saline and enumerated using a Petroff Hauser Counting Chamber. Each culture was further diluted in 0.85% saline to obtain two concentrations of inoculum; 100,000 CFU/ml (Low) and 100,000,000 CFU/ml (High).

*Salmonella* Challenge. One hundred µl of each Low and High diluted *Salmonella* inoculum was pipetted into one of each duplicate palatant tubes to obtain one tube with 1,000 CFU/ml (Low) and one tube with 100,0000 CFU/ml (High). Samples were analyzed immediately after challenging, 24 hours and 6 days after storage at 25° C.

Enumeration of *Salmonella*. Each tube of palatant was vortexed prior to serially diluting. Dilutions were pipetted into sterile petri plates. The plates were poured with tempered (45° C.) XLD agar. After solidification, plates were inverted and placed in an incubator (37° C.). Colonies were counted and CFU/ml was calculated. Detection limit of the method was 1 CFU/ml.

Results

Solutions of cat palatant formulated with fumaric acid at three different concentrations (Table 7) were evaluated for inhibition of *Salmonella* spp. in vitro by measuring *Salmonella* concentration (CFU/ml) over time.

TABLE 7

*Salmonella* counts (CFU/ml) recovered from four cat palatant samples challenged with both a Low (1,000 CFU/ml) and High (1,000,000 CFU/ml) inoculation of *Salmonella* spp.

| | Cat palatant | | | |
|---|---|---|---|---|
| | 0% Fumaric | 14% Fumaric | 20% Fumaric | 27% Fumaric |
| Low inoculation Day | | | | |
| 0 | 1,800 | <1 | <1 | <1 |
| 1 | 5,000 | <1 | <1 | <1 |
| 6 | 3,100,000 | <1 | <1 | <1 |
| High inoculation Day | | | | |
| 0 | 3,800,000 | <1 | <1 | <1 |
| 1 | 1,000,000 | <1 | <1 | <1 |
| 6 | 11,000,000 | <1 | <1 | <1 |

EXAMPLE 4

Evaluation of Other Organic Acids

In this example, we have investigated the efficacy of five organic acids, fumaric acid, succinic acid, sorbic acid, gallic acid, and tannic acid. When tested in cat palatability trials singularly or in combination, these acids were shown to have either no impact on palatability compared to a commercial dry palatant, or in some cases, significantly improved the palatability of the base dry palatant. In addition, the reduction in pH had the secondary benefit of creating an environment that was inhibitory to the growth of selected microbes. These attributes make these particular organic acids attractive candidates for use in dry cat palatant applications and can add functionality to the palatant by functioning as an inhibitor of microbial growth.

Materials and Methods

Test Acids. Fumaric acid, succinic acid, sorbic acid (free acid), tannic acid and gallic acid were evaluated in a dry cat palatant.

Palatant Dry Blend. The dry blend formulation, Prototype 89-87, was designed in such a way that when 2.5% (as % of kibble dry weight) was applied to the surface of the kibble, 20% of that amount (0.5%) consisted of the acid. In trials where only 10% acid was included in the formula (0.25% acid onto the kibble) the remaining 10% of the formula consisted of palatability-neutral filler (corn starch). The remainder of the 89-87 formula consisted of Maillard-reacted liver hydrolysate, dried yeast, tetrasodium pyrophosphate (TSPP) and sodium acid pyrophosphate (SAPP). The proportion of these ingredients remained the same regardless of the organic acid tested. In an effort to increase antimicrobial efficacy, a second formula (89-145) was designed to place a total of 1% acid (0.5% fumaric acid plus 0.5% sorbic acid) on the kibble when coated at 3% of the kibble weight. The other ingredients were the same as described for the 89-87 formula.

Kibble Coating and Palatability Trials. Kibble, fat, and incumbent dry palatant were obtained from the manufacturer. Kibble to be coated was placed in a rotating drum and heated to 40-45° C. with a heat gun. Fat was heated to 60-65° C. and sprayed onto the rotating kibble with an atomizing hand sprayer. Dry palatant (test formulation on A and incumbent on B) was applied to the tumbling kibble with a spoon and the coated kibble allowed to cool to below 40° C. with rotation. Fat (7%), 2.5% formula 89-87 or 3% formula 89-145 was applied to the A ration; 2.5% incumbent formula was applied to ration B in all cases.

Palatability trials and statistical analysis were performed as previously described in Example 1.

Procedures for preparation of dried *Salmonella* inoculum, kibble challenge and microbiological analysis were conducted as previously described in Example 2.

Results

Palatability trials. The parity palatability score obtained with fumaric acid (Trial No. 701) was gratifying and somewhat surprising, since the incumbent is considered to be a very palatable product in the pet food industry (Table 8). Sorbic acid scored significantly higher than the incumbent flavor (Trial No. 702 & 703).

The palatability performance of succinic acid suggested that it would be a palatable alternate to fumaric acid (Trial No. 705 & 706) and that a blend of the two acids might offer a palatability performance advantage (Trial No. 707).

TABLE 8

First set of palatability trials

| Trial No. | Ration A Prototype 89-87 plus indicated acid | Ration B | IR-A | Confirmation Trial No. |
|---|---|---|---|---|
| 701 | FA 0.5% | Incumbent | 0.46 (N.S.) | 716 |
| 702 | SA 0.25% | Incumbent | 0.74 (p ≤ 0.001) | — |
| 703 | SA 0.5% | Incumbent | 0.70 (p ≤ 0.001) | 717 |
| 704 | FA 0.25% + SA 0.25% | Incumbent | 0.40 (p ≤ 0.05) | 718 |
| 705 | Suc 0.25% | Incumbent | 0.56 (N.S.) | — |
| 706 | Suc 0.5% | Incumbent | 0.54 (N.S.) | — |
| 707 | FA 0.25% + Suc 0.25% | Incumbent | 0.62 (p ≤ 0.05) | 726 |

FA = fumaric acid,
SA = sorbic acid,
Suc = succinic acid

Several trials from Round 1 were chosen to be repeated to confirm the original results (Table -9). In these repeat trials, the performance of sorbic acid remained high (Trial No. 717), while fumaric acid and the fumaric-sorbic blend scores improved (Trial No. 716 & 718). All 3 acids appeared to display acceptable palatability for inclusion in dry cat palatant formulations.

TABLE 9

Confirmation trials from first set of palatability trials

| Trial No. | Ration A Prototype 89-87 plus indicated acid | Ration B | IR-A | First round Trial No. |
|---|---|---|---|---|
| 716 | FA 0.25% | Incumbent | 0.65 (p ≤ 0.05) | 701 |
| 717 | SA 0.5% | Incumbent | 0.59 p ≤ 0.001) | 703 |
| 718 | FA 0.25% + SA 0.25% | Incumbent | 0.49 (N.S.) | 704 |
| 726 | FA 0.25% + Suc 0.25% | Incumbent | 0.60 (p ≤ 0.05) | 707 |

FA = fumaric acid,
SA = sorbic acid,
Suc = succinic acid

As shown in Table 10, gallic acid demonstrated very good palatability alone (Trial No. 712) or in combination with fumaric acid (Trial No. 714) or with tannic acid (Trial No. 715). Tannic acid showed acceptable palatability (Trial No. 713). Citric acid alone also provided adequate palatability in formula 89-87 (Trial No. 736).

TABLE 10

Second set of palatability trials

| Trial No. | Ration A Formula 89-87 placing indicated acid amounts on kibble | Ration B | IR-A |
|---|---|---|---|
| 711 | GA 0.25% | Incumbent | 0.55 (N.S.) |
| 712 | GA 0.5% | Incumbent | 0.70 (p ≤ 0.001) |
| 713 | TA 0.25% | Incumbent | 0.55 (N.S) |
| 714 | FA 0.25% + GA 0.25% | Incumbent | 0.67 (p ≤ 0.01) |
| 715 | GA 0.25% + TA 0.25% | Incumbent | 0.60 (p ≤ 0.01) |
| 736 | CA 0.5% | Incumbent | 0.46% (N.S.) |

FA = fumaric acid,
GA = gallic acid,
TA = tannic acid,
CA = citric acid

In Table 11, we saw that the combination of fumaric acid and sorbic acid was sufficiently palatable so that 0.5% of each could be placed on the kibble surface in formula 89-145 while equal palatability to the incumbent flavor was maintained.

TABLE 11

Formula 89-145 palatability trial

| Trial No. | Ration A | Ration B | IR-A |
|---|---|---|---|
| 744 | FA 0.5% + SA 0.5% | Incumbent | 0.54 (N.S.) |

FA = fumaric acid,
SA = sorbic acid

Antimicrobial efficacy trials. The effect of sorbic acid on *Salmonella* challenged on the surface of cat kibble was examined. Cat kibbles were challenged with the dried five strain *Salmonella* cocktail inoculum as previously described. By day 0, *Salmonella* counts from challenged kibbles coated with dry palatant containing sorbic acid, fumaric acid and a combination of the two acids were significantly lower compared to kibbles coated with the control dry palatant (Table 12), demonstrating the antimicrobial efficacy of the compositions. The effect remained significant throughout the study. All acid treatments behaved similarly, as there was no difference in *Salmonella* counts at any time point between treatments.

TABLE 12

Inactivation of *Salmonella* on cat kibble (n = 3) by a dry cat palatant containing two different acids.

| | *Salmonella* (log CFU/g) | | | |
|---|---|---|---|---|
| Time (day) | Control | Fumaric Acid 0.50% | Sorbic Acid 0.50% | Sorbic Acid 0.25% + Fumaric Acid 0.25% |
| 0 | $3.71 \pm 0.02^{Aa}$ | $3.38 \pm 0.02^{Ba}$ | $3.50 \pm 0.06^{Ba}$ | $3.40 \pm 0.04^{Ba}$ |
| 1 | $3.07 \pm 0.01^{Ab}$ | $1.98 \pm 0.02^{Bb}$ | $2.10 \pm 0.08^{Bb}$ | $2.08 \pm 0.15^{Bb}$ |
| 5 | $2.50 \pm 0.02^{Ac}$ | $1.10 \pm 0.10^{Bc}$ | $0.77 \pm 0.39^{Bc}$ | $0.43 \pm 0.43^{Bc}$ |
| 7 | $2.51 \pm 0.13^{Ac}$ | $0.33 \pm 0.33^{Bd}$ | $0.49 \pm 0.49^{Bc}$ | $0.67 \pm 0.33^{Bc}$ |
| 14 | $2.02 \pm 0.09^{Ad}$ | $0.33 \pm 0.33^{Bd}$ | $0.67 \pm 0.33^{Bc}$ | $0.33 \pm 0.33^{Bc}$ |
| 21 | $1.80 \pm 0.10^{Ad}$ | $0.00 \pm 0.00^{Bd}$ | $0.00 \pm 0.00^{Bc}$ | $0.00 \pm 0.00^{Bc}$ |

Inactivation of *Salmonella* on cat kibble by a palatant was evaluated at different times.
$^{A-B}$Any means in the same row followed by different letters are significantly (p < 0.05) different by LSD separation of means method.
$^{a-c}$Any means in the same column followed by different letters are significantly different (p < 0.05) by LSD separation of means method.

The effect of succinic acid on *Salmonella* challenged on the surface of cat kibble was examined. Cat kibbles were challenged with the dried five strain *Salmonella* cocktail inoculum prep as previously described. By day 1, challenged kibbles coated with dry palatant containing a combination of succinic and fumaric acids had significantly lower *Salmonella* counts compared to kibbles coated with the control dry palatant (Table 13). The effect remained significant throughout the study.

TABLE 13

Inactivation of *Salmonella* on cat kibble (n = 3) by a dry cat palatant containing a combination of succinic and fumaric acids.

| | *Salmonella* (log CFU/g) | |
|---|---|---|
| Time (day) | Control | Succinic Acid 0.25% + Fumaric Acid 0.25% |
| 0 | $3.03 \pm 0.03^{Aa}$ | $2.74 \pm 0.15^{Aa}$ |
| 1 | $2.79 \pm 0.06^{Ab}$ | $2.08 \pm 0.09^{Bb}$ |
| 3 | $2.53 \pm 0.04^{Ac}$ | $1.00 \pm 0.00^{Bc}$ |
| 8 | $1.97 \pm 0.03^{Ad}$ | $0.67 \pm 0.33^{Bc}$ |
| 15 | $1.82 \pm 0.02^{Ae}$ | $0.00 \pm 0.00^{Bd}$ |

Inactivation of *Salmonella* on cat kibble by a palatant was evaluated at different times.
$^{A-B}$Any means in the same row followed by different letters are significantly (p < 0.05) different by LSD separation of means method.
$^{a-c}$Any means in the same column followed by different letters are significantly different (p < 0.05) by LSD separation of means method.

These studies indicate that the organic acids, sorbic and succinic, alone or in combination with fumaric acid are effective at significantly reducing *Salmonella* on the surface of cat kibbles when delivered at concentrations in which there is no adverse palatability.

Expanding on combinations shown in Tables 12 and 13 the percentage of acids on the surface was increased to a total of 1% in the following combinations: 0.5% SA+0.5% FA and 0.5% Suc+0.5% FA; and in addition we expanded the organic acid investigation to include citric acid (CA), tannic acid (TA) and gallic acid (GA) each at 0.5% on the kibble surface. The effect of each acid and combination on *Salmonella* challenged on the surface of cat kibble was examined and results are displayed in Table 14. Cat kibbles were challenged with dried five strain *Salmonella* cocktail inoculum as previously described. *Salmonella* counts were significantly lower for the 1% combination of FA+Suc and FA+SA compared to single acids at 0.5%. After 23 days all kibbles treated with acid, regardless of inclusion rate, had significantly lower *Salmonella* counts than the control.

TABLE 14

Inactivation of *Salmonella* challenge on cat kibble (n = 3) by a dry cat palatant containing acids.

| | *Salmonella* (log CFU/g) | | | | | |
|---|---|---|---|---|---|---|
| Time (day) | Control | CA 0.5% | TA 0.5% | GA 0.5% | FA 0.5% + Suc 0.5% | FA 0.5% + SA 0.5% |
| 0 | $3.26 \pm 0.14^{Aa}$ | $2.05 \pm 0.05^{Ba}$ | $3.19 \pm 0.17^{Aa}$ | $2.83 \pm 0.44^{Aa}$ | $1.55 \pm 0.07^{Ba}$ | $1.80 \pm 0.10^{Ba}$ |
| 1 | $2.21 \pm 0.03^{ABb}$ | $1.54 \pm 0.16^{BCDab}$ | $2.51 \pm 0.26^{Ab}$ | $1.33 \pm 0.20^{DEb}$ | $1.00 \pm 0.00^{DEab}$ | $0.74 \pm 0.47^{Eb}$ |
| 3 | $2.09 \pm 0.05^{Ab}$ | $1.46 \pm 0.09^{ABb}$ | $2.05 \pm 0.18^{Ab}$ | $0.98 \pm 0.49^{BCbc}$ | $0.49 \pm 0.49^{Cbc}$ | $0.33 \pm 0.33^{Cb}$ |
| 7 | $1.32 \pm 0.16^{Ac}$ | $0.77 \pm 0.39^{ABc}$ | $1.50 \pm 0.10^{Ac}$ | $0.77 \pm 0.39^{ABbc}$ | $0.00 \pm 0.00^{Bc}$ | $0.00 \pm 0.00^{Bb}$ |
| 14 | $0.33 \pm 0.33^{Bc}$ | $0.00 \pm 0.00^{Bd}$ | $1.46 \pm 0.16^{Ac}$ | $0.33 \pm 0.33^{Bbc}$ | $0.00 \pm 0.00^{Bc}$ | $0.00 \pm 0.00^{Bb}$ |
| 23 | $1.00 \pm 0.00^{Ad}$ | $0.00 \pm 0.00^{Bd}$ | $0.00 \pm 0.00^{Bd}$ | $0.00 \pm 0.00^{Bc}$ | $0.00 \pm 0.00^{Bc}$ | $0.00 \pm 0.00^{Bb}$ |

Inactivation of *Salmonella* on cat kibble by a palatant was evaluated at different times.
$^{A-E}$Any means in the same row followed by different letters are significantly (p < 0.05) different by LSD separation of means method.
$^{a-d}$Any means in the same column followed by different letters are significantly different (p < 0.05) by LSD separation of means method.

These studies indicate that the organic acids, tannic acid, gallic acid, citric acid and succinic acid, alone or in combination with fumaric acid are effective at significantly reducing *Salmonella* on the surface of cat kibbles when delivered at concentrations in which there is no adverse palatability.

EXAMPLE 5

Dog Kibble Palatability and Challenge

Dog kibbles coated with dry palatants containing fumaric acid or SBS (Tables 15 and 16) or fumaric acid in combination with sorbic, succinic and gallic acid (Tables 17 and 18) were coated and subjected to palatability testing and dry kibble challenge as previously described.

Results

Dry dog palatants were formulated with fumaric acid or SBS to deliver 0.5% acid to the surface of the kibble. The effect of each acid on *Salmonella* challenged on the surface of dog kibble was examined. Dog kibbles were challenged with dried five strain *Salmonella* cocktail inoculum. Results are displayed in Table 15.

Palatant with fumaric acid at 0.5% on the kibble resulted in significantly lower *Salmonella* counts than the control and SBS formula immediately (day 0) and that trend remained for the rest of the trial.

TABLE 16

Palatability of dog formula 135p59 versus dog formula DD1.0.

| Trial No. | Ration A | Ration B | IR-A |
|---|---|---|---|
| 537 | 2% Formula 135p59 delivers 0.4% Fumaric acid to kibble | 2% Formula DD1.0; delivers 0.4% sodium bisulfite (SBS) to kibble | 0.641 ($p \leq 0.05$) |

Dry dog palatants were formulated with fumaric acid and fumaric acid in combination with sorbic acid (SA), succinic acid (Suc) and gallic acid (GA) to deliver a total of 0.5% acid to the surface of the kibble. The effect of each acid on *Salmonella* challenged on the surface of dog kibble was examined. Dog kibbles were challenged with dried five strain *Salmonella* cocktail inoculum prep. Results are displayed in Table 17.

Palatant with fumaric acid at 0.5% on the kibble resulted in significantly lower *Salmonella* counts than the control immediately (day 0) and that trend remained for the rest of the trial. By day 6 of the trial, palatants containing fumaric, and fumaric in combination with sorbic acid or succinic acid were not significantly different from each other but were different from control. By day 21, fumaric acid+gallic acid combination was lower than the control ($p<0.05$).

TABLE 17

Inactivation of *Salmonella* challenge on dog kibble (n = 3) by a dry dog palatant containing acids.

| | *Salmonella* (log CFU/g) | | | | |
|---|---|---|---|---|---|
| Time (day) | Control | FA 0.5% | FA 0.25% + SA 0.25% | FA 0.25% + Suc 0.25% | FA 0.25% + GA 0.25% |
| 0 | $2.67 \pm 0.20^{Aa}$ | $1.99 \pm 0.22^{CDa}$ | $2.04 \pm 0.14^{ABCa}$ | $1.64 \pm 0.17^{Da}$ | $2.36 \pm 0.29^{ABa}$ |
| 1 | $1.92 \pm 0.09^{Ab}$ | $0.43 \pm 0.43^{Bb}$ | $1.39 \pm 0.21^{Ab}$ | $1.43 \pm 0.13^{Aa}$ | $1.20 \pm 0.20^{Ab}$ |
| 6 | $1.67 \pm 0.11^{Ab}$ | $0.00 \pm 0.00^{Bb}$ | $0.00 \pm 0.00^{Bc}$ | $0.33 \pm 0.33^{Bb}$ | $1.36 \pm 0.18^{Ab}$ |
| 14 | $1.10 \pm 0.10^{Ac}$ | $0.00 \pm 0.00^{Bb}$ | $0.00 \pm 0.00^{Bc}$ | $0.00 \pm 0.00^{Bb}$ | $0.77 \pm 0.39^{Abc}$ |
| 21 | $1.10 \pm 0.10^{Ac}$ | $0.00 \pm 0.00^{Bb}$ | $0.00 \pm 0.00^{Bc}$ | $0.00 \pm 0.00^{Bb}$ | $0.00 \pm 0.00^{Bc}$ |

Inactivation of *Salmonella* on dog kibble by a palatant was evaluated at different times.
[A-B] Any means in the same row followed by different letters are significantly ($p < 0.05$) different by LSD separation of means method.
[a-c] Any means in the same column followed by different letters are significantly different ($p < 0.05$) by LSD separation of means method.

TABLE 15

Inactivation of *Salmonella* on dog kibble (n = 3) by a dry dog palatant.

| | *Salmonella* (log CFU/g) | | |
|---|---|---|---|
| Time (day) | Control | FA 0.50% | SBS 0.50% |
| 0 | $3.02 \pm 0.14^{Aa}$ | $1.98 \pm 0.14^{Ca}$ | $2.50 \pm 0.05^{Ba}$ |
| 1 | $2.11 \pm 0.09^{Ab}$ | $1.10 \pm 0.10^{Cb}$ | $1.59 \pm 0.06^{Bab}$ |
| 3 | $2.18 \pm 0.08^{Acb}$ | $0.77 \pm 0.39^{Abc}$ | $1.19 \pm 0.59^{Abc}$ |
| 7 | $2.57 \pm 0.29^{Aab}$ | $0.33 \pm 0.33^{Bcd}$ | $0.83 \pm 0.44^{Bbcd}$ |
| 9 | $2.11 \pm 0.04^{Ad}$ | $0.33 \pm 0.33^{Bcd}$ | $0.49 \pm 0.49^{Bde}$ |
| 14 | $2.68 \pm 0.19^{Aa}$ | $0.00 \pm 0.00^{Bd}$ | $0.33 \pm 0.33^{Bde}$ |
| 21 | $2.81 \pm 0.06^{Aa}$ | $0.00 \pm 0.00^{Bd}$ | $0.00 \pm 0.00^{Be}$ |

Inactivation of *Salmonella* on dog kibble by a palatant was evaluated at different times.
[A-C] Any means in the same row followed by different letters are significantly ($p < 0.05$) different by LSD separation of means method.
[a-e] Any means in the same column followed by different letters are significantly different ($p < 0.05$) by LSD separation of means method.

TABLE 18

Palatability of dog formulas delivering 0.5% total acid to the kibble.

| Trial No. | Ration A | Ration B | IR-A |
|---|---|---|---|
| 739 | DD20FA facsimile; delivers 0.25% Fumaric acid + 0.25% Sorbic acid to kibble | DD20FA facsimile without fumaric acid | 0.435 (N.S.) |
| 740 | DD20FA facsimile; delivers 0.25% Fumaric acid + 0.25% Succinic acid to kibble | DD20FA facsimile without fumaric acid | 0.52 (N.S.) |
| 741 | DD20FA facsimile; delivers 0.25% Fumaric acid + 0.25% Gallic acid to kibble | DD20FA facsimile without fumaric acid | 0.33 ($p \leq 0.01$) |

TABLE 18-continued

Palatability of dog formulas delivering 0.5% total acid to the kibble.

| Trial No. | Ration A | Ration B | IR-A |
|---|---|---|---|
| 742 | DD20FA; delivers 0.5% Fumaric acid to kibble | DD20FA facsimile without fumaric acid | 0.434 (N.S.) |

These studies indicate that the organic acids, sorbic acid and succinic acid, alone or in combination with fumaric acid are effective at significantly reducing *Salmonella* on the surface of dog kibbles when delivered at concentrations in which there is no adverse palatability.

The foregoing description and drawings comprise illustrative embodiments of the present inventions. The foregoing embodiments and the methods described herein may vary based on the ability, experience, and preference of those skilled in the art. Merely listing the steps of the method in a certain order does not constitute any limitation on the order of the steps of the method. The foregoing description and drawings merely explain and illustrate the invention, and the invention is not limited thereto, except insofar as the claims are so limited. Those skilled in the art who have the disclosure before them will be able to make modifications and variations therein without departing from the scope of the invention.

We claim:

1. A method for preserving a dry pet food kibble for dogs and cats, the method comprising the steps of applying a coating composition to the surface of the dry pet food kibble, wherein the coating composition comprises an organic acid composition consisting of fumaric acid in an amount that provides antibacterial efficacy against *Salmonella* ssp to the dry pet food kibble without adversely affecting the palatability of the dry pet food kibble, wherein the coating composition is applied in an amount providing fumaric acid at between 0.05% and 3.0% by weight of the dry pet food kibble.

2. The method of claim 1, wherein the coating composition is applied in an amount providing fumaric acid at between 0.1% and 1.2% by weight of the dry pet food kibble.

3. The method of claim 2, wherein the coating composition is applied in an amount providing said fumaric acid at between 0.2% and 1.0% by weight of the dry pet food kibble.

4. The method of claim 1, wherein the coating composition is applied in an amount providing said fumaric acid at between 0.1% and 2.0% by weight of the dry pet food kibble.

* * * * *